United States Patent
Brown (10) Patent No.: US 6,226,356 B1
(45) Date of Patent: May 1, 2001

(54) METHOD AND APPARATUS FOR POWER REGULATION OF DIGITAL DATA TRANSMISSION

(75) Inventor: Glen W. Brown, Austin, TX (US)

(73) Assignee: Legerity Inc., Austin, TX (US)

(*) Notice: Subject to any disclaimer, the term of this patent is extended or adjusted under 35 U.S.C. 154(b) by 0 days.

(21) Appl. No.: 09/097,031

(22) Filed: Jun. 12, 1998

(51) Int. Cl.$^7$ .................................................. H04M 1/24
(52) U.S. Cl. .............................. 379/24; 379/27; 379/30
(58) Field of Search .................... 379/26, 30, 1, 379/412, 413, 24, 27, 29; 375/222, 225, 260, 224, 261; 370/241, 248, 252; 324/533, 532, 527, 534, 528, 541, 519, 537, 525, 658, 524, 600, 771

(56) References Cited

U.S. PATENT DOCUMENTS

| | | | |
|---|---|---|---|
| 4,238,648 | * 12/1980 | Epworth | 455/601 |
| 5,063,351 | * 11/1991 | Goldthrop et al. | 324/628 |
| 5,079,507 | * 1/1992 | Ishida et al. | 324/645 |
| 5,206,600 | * 4/1993 | Moehlmann | 324/650 |
| 5,479,447 | 12/1995 | Chow et al. | 375/260 |
| 5,694,517 | * 12/1997 | Sugino et al. | 379/20 |
| 5,832,387 | 11/1998 | Bae et al. | 455/127 |
| 5,864,602 | 1/1999 | Needle | 379/30 |
| 5,881,130 | * 3/1999 | Zhang | 379/6 |
| 5,956,372 | 9/1999 | Vaman et al. | 375/260 |
| 5,991,269 | 11/1999 | Williamson et al. | 370/241 |
| 6,002,671 | * 12/1999 | Kahoska et al. | 370/248 |
| 6,058,162 | * 5/2000 | Nelson et al. | 379/27 |
| 6,061,393 | * 5/2000 | Tsui et al. | 375/224 |
| 6,061,427 | * 5/2000 | Ryoo | 379/1 |
| 6,091,713 | * 7/2000 | Lechleider et al. | 379/27 |

* cited by examiner

*Primary Examiner*—Curtis Kuntz
*Assistant Examiner*—Rexford Barnie
(74) *Attorney, Agent, or Firm*—Williams, Morgan & Amerson, P.C.

(57) ABSTRACT

A method and apparatus is provided for regulating transmission power of a signal on a line. The method includes determining characteristics of the line, determining the transmission power needed to transmit the signal in response to the characteristics of the line, and transmitting the signal on the line in response to determining the transmission power.

44 Claims, 8 Drawing Sheets

METHOD AND APPARATUS FOR POWER REGULATION OF DIGITAL DATA TRANSMISSION

BACKGROUND OF THE INVENTION

1. Field of the Invention

This invention relates generally to transmission of signals, and, more particularly, to regulating transmission power of a signal carrying digital data.

2. Description of the Related Art

The telecommunications sector is undergoing a major metamorphosis. The change has been induced by three primary factors. First is the growing number of users demanding more bandwidth for faster data transmission. Second is the congestion in the Plain Old Telephone Service (POTS), designed for transmission of voice signals in analog form. Third is the Telecommunications Reform Act, which is fostering broader competition through deregulation. All three of the aforementioned factors call for a more effective and efficient means for transporting data at high speeds.

To meet the demand for high-speed communication, designers are seeking innovative and cost-effective solutions that take advantage of the existing network infrastructure. Several technological advancements have been made in the telecommunications industry that make use of the existing network of telephone wires. The most promising of these technologies is the Digital Subscriber Line (DSL) technology.

DSL is making the existing network of telephone lines more robust and versatile. Once considered virtually unusable for broadband communications, an ordinary twisted pair equipped with DSL interfaces can transmit videos, television, and very high-speed data. The fact that more than six hundred million telephone lines exist around the world is a compelling reason that these lines will serve as the primary transmission conduits for at least several more decades. Because DSL utilizes telephone wiring already installed in virtually every home and business in the world, it has been embraced by many as one of the more promising and viable options.

There are now at least four popular versions of DSL technology, namely Asymmetrical Digital Subscriber Line (ADSL), Integrated Services Digital Network Digital Subscriber Line (IDSL), Very High-Speed Digital Subscriber Line (VDSL), and Symmetric Digital Subscriber Line (SDSL). Although each technology is generally directed at different types of users, they all share certain characteristics. For example, all four DSL systems utilize the existing, ubiquitous telephone wiring infrastructure, deliver greater bandwidth, and operate by employing special digital signal processing. Because the aforementioned technologies are well known in the art, they will not be described in detail herein.

DSL, as well as its later siblings, is making it possible for users to communicate over normal telephone wires at a much faster rate than before. The different flavors of DSL will converge around specific market niches and applications. For example, home users may favor ADSL for uses such as video-on-demand and Internet access. On the other hand, small businesses could find IDSL attractive for telecommuting and high-speed data transmission. Large businesses might choose VDSL to deliver Internet traffic or limited multimedia traffic to large businesses.

DSL technologies leave Plain Old Telephone Service undisturbed. Traditional analog voice band interfaces use the same frequency band, 0–4 Kilohertz (KHz), as telephone service, thereby preventing concurrent voice and data use. A DSL interface, on the other hand, operates at frequencies above the voice channels from 100 KHz to 1.1 Megahertz (MHz). Thus, a single DSL line is capable of offering simultaneous channels for voice and data.

DSL systems use digital signal processing (DSP) to increase throughput and signal quality through common copper telephone wire. It provides a downstream data transfer rate from the DSL Point-of-Presence (POP) to the subscriber location at speeds of up to 1.5 Megabits per second (MBPS). The transfer rate of 1.5 MBPS, for instance, is fifty times faster than a conventional 28.8 kilobits per second (KBPS).

Although DSL and POTS systems can co-exist on one line (e.g., also referred to as "subscriber line"), the DSL traffic is not passed through the POTS circuitry due to the different bandwidth, voltage, and power needs between the two systems. The DSL signal is typically driven onto the subscriber line by a separate driver than is the POTS signal because the two signals are very different. A DSL signal has a lower voltage, wider bandwidth, and often requires a different number of bits of resolution when digitized.

The length of subscriber lines can vary considerably, ranging from a few thousand feet to over eighteen thousand feet. Generally, DSL line drivers are designed to operate over worst case scenarios. That is, DSL line drivers are typically designed to transmit signals over subscriber lines without regard to particular characteristics of each subscriber line, such as the actual length or the transmission quality of each specific subscriber line. In so doing, the DSL drivers are prone to use excessive power in transmitting signals on subscriber lines that may be shorter than the worst case. For example, at a DSL bandwidth of approximately 1 Megahertz, a DSL line driver will drive a signal onto a 1000 foot subscriber line with the same transmission power as it would if it were driving a signal onto a 10,000 foot subscriber line. Thus, what is needed is a method and apparatus for regulating transmission power of signals carrying digital data based on the characteristics of the transmission medium.

Designing a DSL driver to account for the worst case scenario not only wastes power on short lines but can also introduce excessive near end cross-talk (NEXT) in adjacent subscriber lines. Because the subscriber lines generally tend to be concentrated in the central switching office, any driver dissipating excess power can cause additional unwanted interference in the nearby subscriber lines.

The present invention is directed to overcoming, or at least reducing the effects of, one or more of the problems set forth above.

SUMMARY OF THE INVENTION

In one aspect of the present invention, a method is provided for regulating transmission power of a signal on a line. The method includes determining characteristics of the line, determining the transmission power needed to transmit the signal in response to the characteristics of the line, and transmitting the signal on the line in response to determining the transmission power.

In one aspect of the present invention, an apparatus is provided for regulating transmission power of a signal. The apparatus includes a DSL circuitry, a test measurement circuit capable of measuring characteristics of a line, and a control logic capable of providing a control signal to the DSL circuitry to regulate the transmission power of the signal based on the characteristics of the line.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The term "transmission power," as defined herein, may include power utilized in processing or transmitting a signal. "Processing" may include modulating a signal, demodulating a signal, converting it from analog to digital or vice versa, or the like.

First Embodiment

Figure 1:
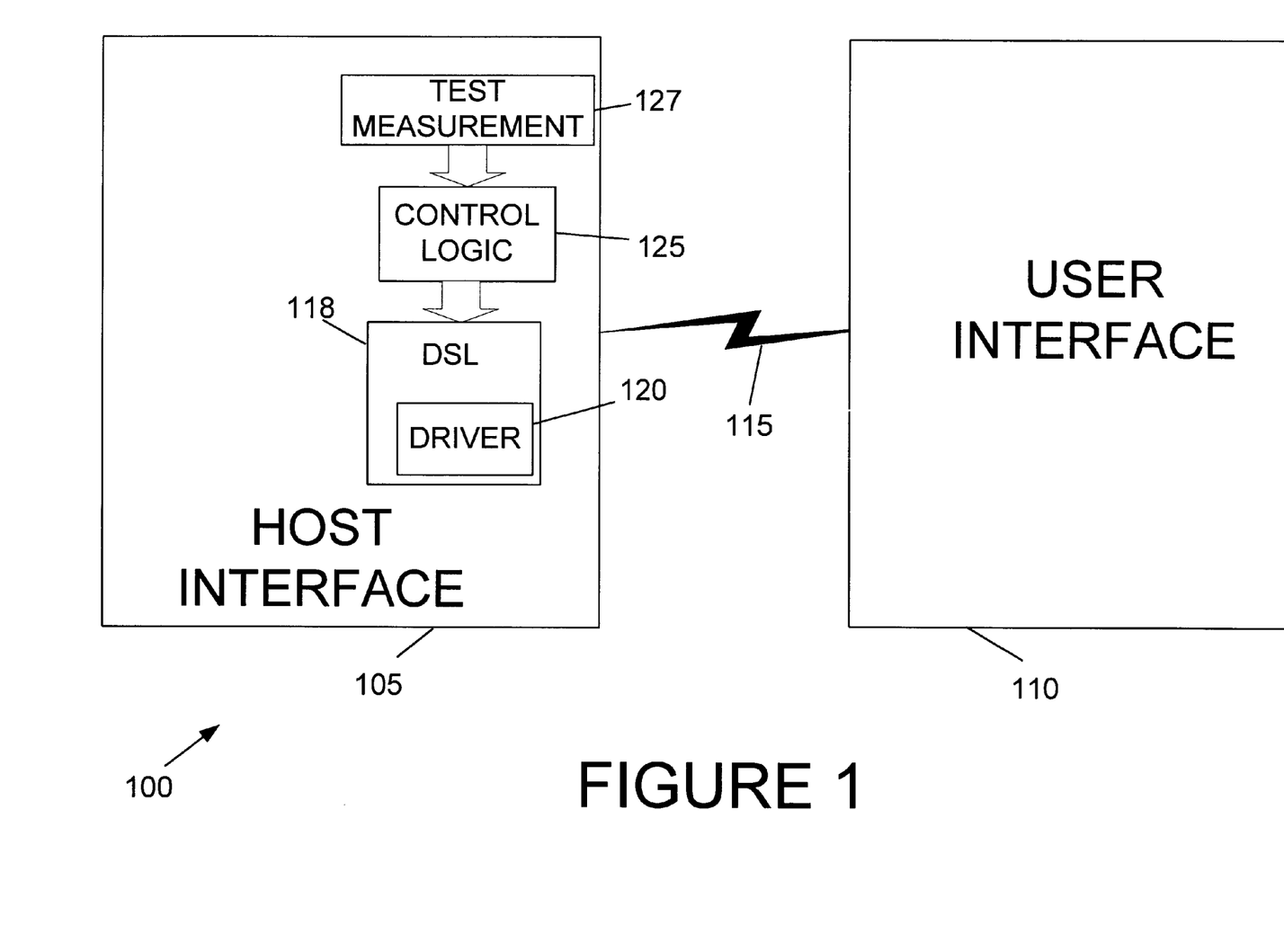
FIG. 1 illustrates a block diagram of one embodiment of the communications system of the present invention.

Referring now to the figures, and in particular to FIG. 1, which illustrates a block diagram of a communications system 100. The communications system 100 includes a host interface 105 coupled to a user interface 110 by a connection 115. In the illustrated embodiment, the connection 115 is an ordinary twisted pair connection (also referred to as "subscriber line"), as is common in present day telephone networks. The term "subscriber line," as used herein, may include Public Switched Telephone Network (PSTN) line, a Private Branch Exchange (PBX) line, or other types of lines utilized in transmitting voice/data signals.

The host and user interfaces 105, 110 in the illustrated embodiment are DSL-technology interfaces, and thus may be ADSL, IDSL, HDSL, or other digital subscriber line interfaces. The host interface 105, which may be located in a central switching office, includes a DSL circuitry 118 and a line driver 120 capable of driving signals onto the subscriber line 115. The user interface 110, which may reside at a customer's residence, is capable of receiving signals transmitted by the line driver 120 of the DSL circuitry 118. The signals transmitted and received by the two interfaces 105, 110 may be analog waveforms of digital symbols.

The communications system 100 includes a control logic 125 and a test measurement circuit 127. The test measurement circuit 127 is capable of measuring certain line characteristics of the subscriber line 115, which include, but are not limited to, the capacitance, inductance, or impedance of the subscriber line 115. The test measurement circuit 127 can measure either the capacitance, inductance, or impedance of the subscriber line 115 using any of a variety of methods known to the art, including applying a voltage to the subscriber line 115 terminals (not shown) and then measuring current.

Figure 2A:
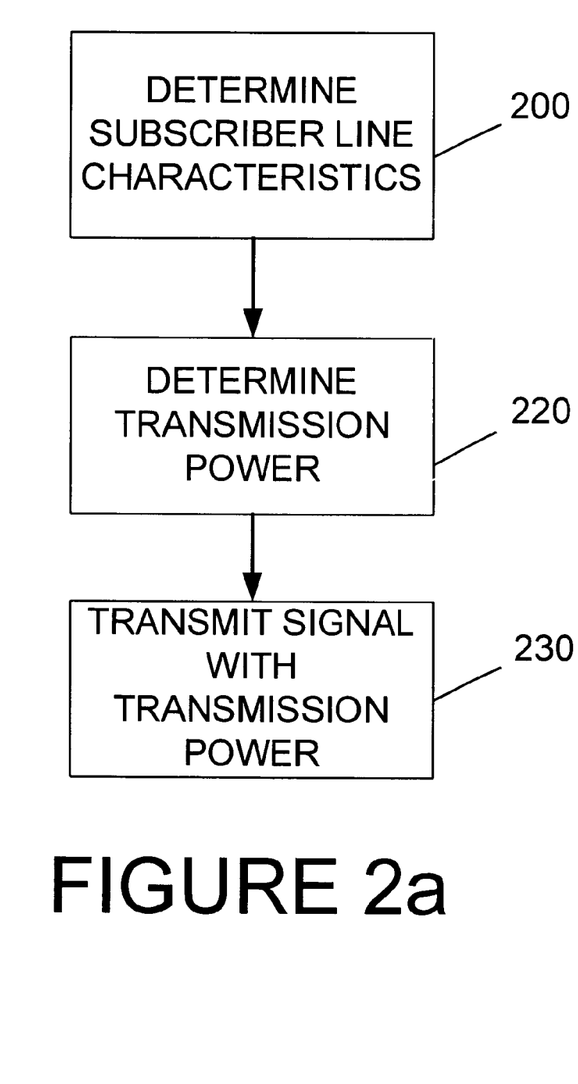
FIG. 2a depicts one embodiment of a method of the present invention that can be employed by the communications system of FIG. 1.

FIG. 2a illustrates one method of the present invention that can be employed by the communications system 100 of FIG. 1. The method of FIG. 2a begins at block 200, where the test measurement circuit 127 measures the line characteristics of the subscriber line 115. As noted above, measuring the line characteristics may entail measuring the capacitance, inductance, impedance, or any combination thereof, of the subscriber line 115.

At block 220, based on the characteristics of the subscriber line 115, the control logic 125 determines the transmission power required by the driver 120 to drive a signal onto the subscriber line 1 15. The amount of transmission power required to drive the signal can be determined in a variety of ways, including utilizing mathematical equations or look-up tables. The look-up table, for example, could include information that equates a particular impedance of the subscriber line 115 to the amount of transmission power needed to transmit a signal on the subscriber line 115. The amount of transmission power required to drive the signal may vary from one implementation to another. However, generally, the transmission power of the driver 120 should be capable of producing an adequate signal-to-noise ratio at the user interface 110 (i.e., the receiving end). At block 230, the driver 120 drives the signal using the transmission power calculated at the block 220.

Figure 2B:
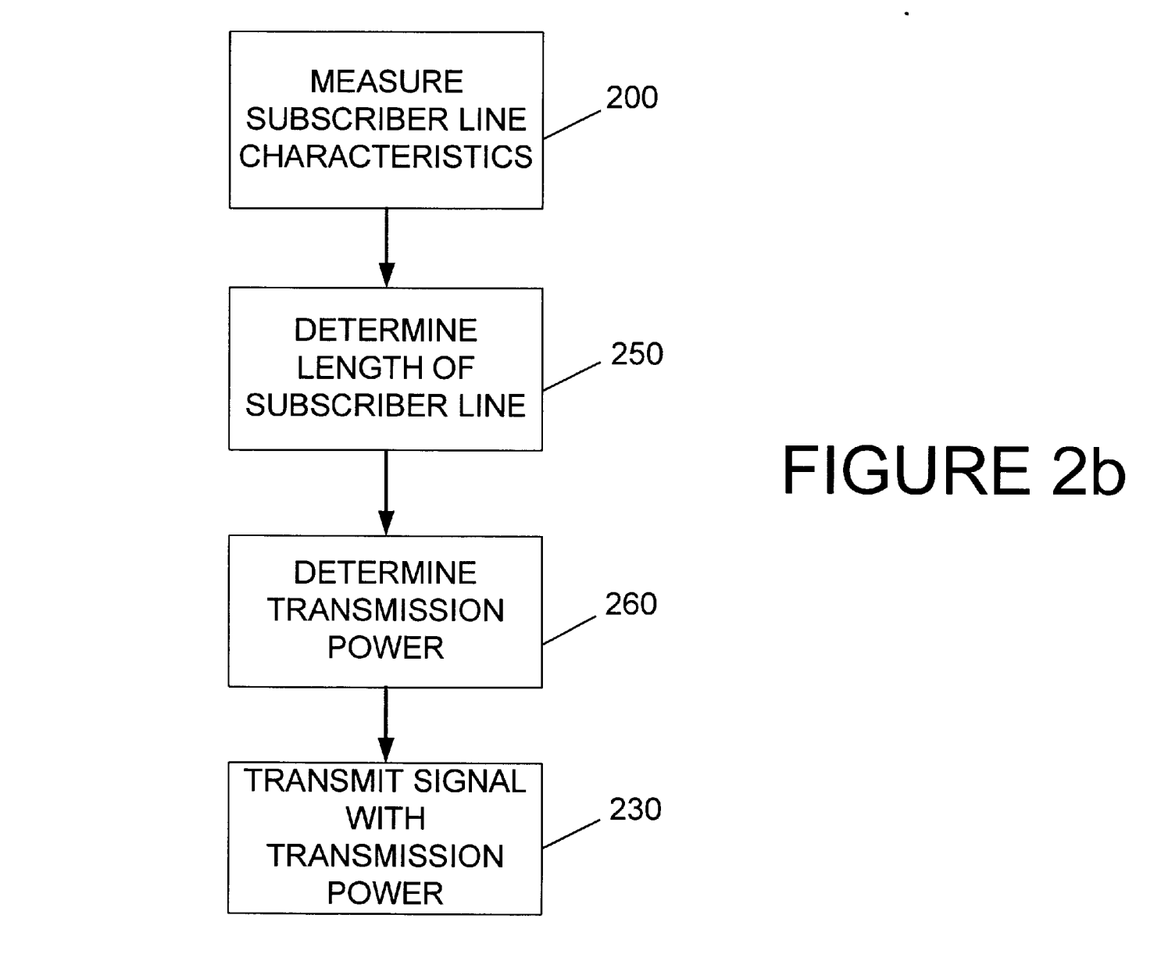
FIG. 2b depicts an alternative embodiment of a method of the present invention that can be employed by the communications system of FIG. 1.

FIG. 2b illustrates an alternative embodiment of the method of FIG. 2a. As can be seen, the blocks 200 and 230 are identical to the blocks of FIG. 2a. FIG. 2b includes an intermediary step at block 250, where the control logic 125 determines the length of the subscriber line 115 based on the measured characteristics of the subscriber line 115. At block 260, based on the length of the subscriber line 115, the control logic 125 determines the transmission power required by the driver 120 to drive a signal onto the subscriber line 115. It is envisioned that the length of the subscriber line 115 may be determined in one of several ways. For example, mathematical algorithms known in the art may be employed to determine the subscriber line 115 length based on the subscriber line's 115 capacitance, inductance, or impedance. Or, alternatively, it is also possible to create a look-up table wherein the look-up table would include information that is relevant in the determination of the length of the subscriber line 115. The look-up table may, for instance, include entries such as the gauge of the subscriber line 115 and the type (e.g., material) of the subscriber line 115. These entries can then be utilized in determining the length of the subscriber line 115. Those skilled in the art will appreciate that other known methods of calculating the length of the subscriber line 115 based on subscriber line's 115 characteristics may be employed in accordance with the present invention.

Although it may be possible to determine the precise length of the subscriber line 115 using the measured characteristics of the subscriber line 115, such precision may not be necessary in other embodiments of the present invention. That is, in an alternative embodiment, the transmission power needed to transmit a signal can be based on an approximate length of the subscriber line 115. For example, based on the measured characteristics of the subscriber line 115, the control logic 125 can first categorize the length (i.e., very long, long, medium, short, very short, etc.), and then determine the amount of transmission power required to transmit a signal for a length in a particular category.

In one embodiment, at the block 200, the control logic 125 can measure an impedance of the subscriber line 115 at high frequencies. At the block 250 (see FIG. 2b), the control logic 125 can determine the approximate length of the subscriber line 115 using the impedance calculated at the block 200. Next, at the block 260, the control logic 125 determines the amount of transmission power required by the driver 120 to drive a signal onto the subscriber line 115. Alternatively, instead of determining the length of the subscriber line 115 at the block 250, it may be possible to directly determine the transmission power at the block 220 (see FIG. 2a) based on the measured characteristics of the subscriber line 115. At the block 230 (see FIGS. 2a and 2b), the driver 120 drives the signal using the transmission power calculated in the block 260.

Second Embodiment

Figure 3:
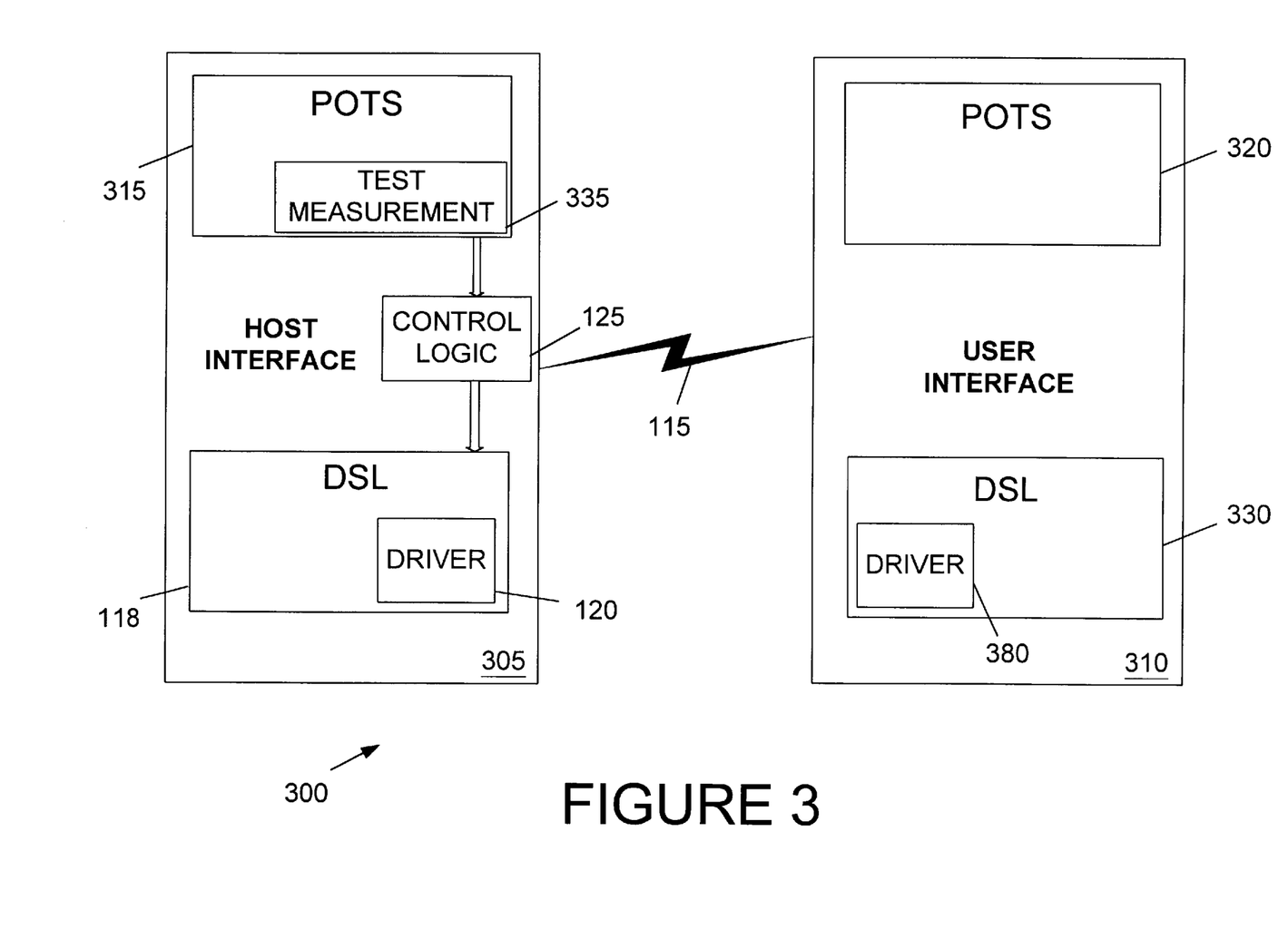
FIG. 3 illustrates a block diagram of a second embodiment of the communications system of the present invention that can be utilized to implement the methods of FIG. 2a and FIG. 2b.

FIG. 3 illustrates a second embodiment of an apparatus with which the methods of FIGS. 2a and 2b can be implemented. FIG. 3 depicts a block diagram of a communications system 300. The communications system 300 includes a host interface 305 coupled to a user interface 310 by the subscriber line 115. In the illustrated embodiment, the subscriber line 115 is an ordinary twisted pair connection, as is common in present day telephone networks. However, other connection types are contemplated, depending on the specific implementation.

In the illustrated embodiment, the communications system 300 supports both a DSL system and Plain Old Telephone Service (POTS). Accordingly, the host interface 305 and the user interface 310 include POTS circuitry 315, 320 and DSL circuitry 118, 330, respectively. The host interface 305 can be a line card, for example, that supports both POTS and DSL technology. The DSL circuitry 118 may be circuitry for ADSL, IDSL, HDSL, or other digital subscriber line technology.

The host interface 305 includes the control logic 125, the DSL circuitry 118, and the POTS circuitry 315. The POTS circuitry 315 includes a test measurement circuit 335 that is capable of measuring the line characteristics of the subscriber line 115. Accordingly, the test measurement circuit 335 of the POTS circuitry 315, at the block 200 (see FIGS. 2a and 2b), measures the line characteristics of the subscriber line 115. The control logic 125 receives the line characteristics measured by the test measurement circuit 335 and, at the block 250 (see FIG. 2b), determines the length of the subscriber line 115 based on the measured characteristics. At the block 260 (see FIG. 2b), based on the subscriber line 115 length, the control logic 125 determines the amount of transmission power that is needed by the DSL driver 120 to transmit a signal onto the subscriber line 115 to ensure that an adequate signal-to-noise ratio is received by the user interface 330 (i.e., at the receiving end). Or, in an alternative embodiment, the control logic 125 can determine, at the block 220 (see FIG. 2a), the transmission power required by the DSL driver 120 to transmit a signal based on the line characteristics (e.g., without calculating the length of the subscriber line 115 first). The driver 120, at the block 230 (see FIGS. 2a and 2b), transmits the signal with the transmission power determined by the control logic 125. The transmission power of the driver 120 can be controlled by a control signal provided by the control logic 125 to a control input (not shown) of the driver 120.

The POTS circuitry 315 commonly includes the test measurement circuit 335, or its equivalent, capable of measuring a variety of subscriber line 115 characteristics for testing purposes. The second embodiment of the present invention incorporates this existing feature of the POTS circuitry 315 for the purposes of measuring capacitance, impedance, or inductance of the subscriber line 115. Thus, because the host interface 305 includes the POTS circuitry 315 having the test measurement circuit 335, there is no longer a need for the standalone test measurement circuit 127 of the first embodiment to measure the subscriber line 115 characteristics. Examples of measurements commonly performed by the test measurement circuit 335 in conventional POTS circuitry 315 include foreign voltage test, excessive leakage current, and capacitance or impedance measurements. These measurements are typically used to determine faulty subscriber line 115 conditions. The foreign voltage test can detect unwanted high voltage values, and the excessive leakage current test checks for the leakage resistance in the subscriber line 115. The test for capacitance, inductance, or impedance measurement, which can also aid in determining faults in the subscriber line 115, entails measuring the respective capacitance, inductance, or impedance of the subscriber line 115.

Figure 4:
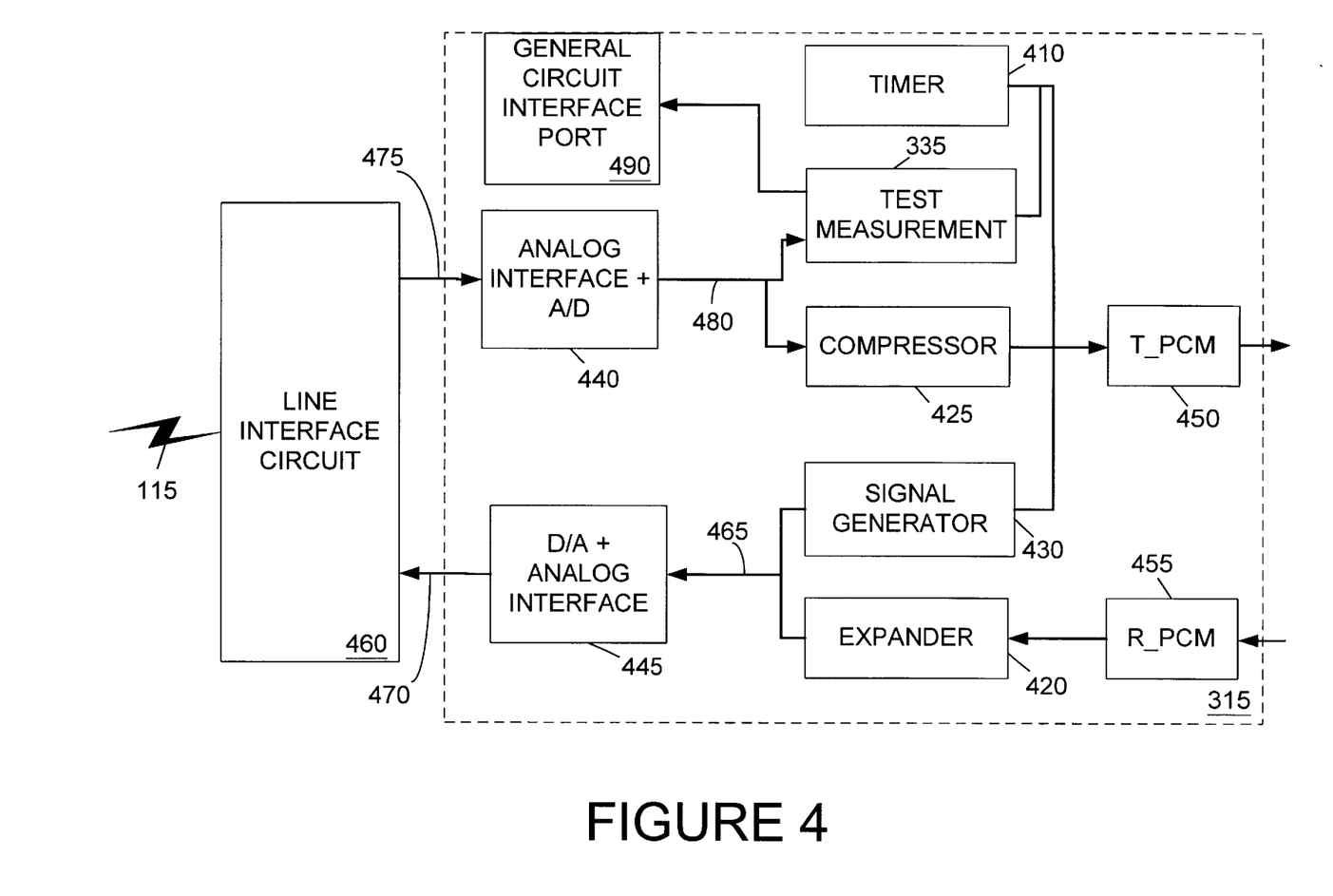
FIG. 4 depicts a block diagram of a POTS circuitry that may be employed in the communications system of FIG. 3.

FIG. 4 illustrates a block diagram of the POTS circuitry 315 that includes an exemplary test measurement circuit 335 capable of measuring the capacitance of the subscriber line 115. The POTS circuitry 315 includes a timer 410, a compressor 425, an expander 420, a signal generator 430, an analog-to-digital (A/D) converter 440, a digital-to-analog (D/A) converter 445, a transmitter Pulse Code Modulated (PCM) interface 450, and a receiver PCM interface 455. The POTS circuitry 315 is coupled to the subscriber line 115 via a line interface circuit 460. For clarity, only essential elements of the test measurement function of the POTS circuitry 315 are shown in FIG. 4. The signal generator 430 generates a digitized current sine wave on a line 465, which is then converted to an analog signal and delivered over a line 470 by the D/A converter 445. The analog signal is placed onto the subscriber line 115 through the line interface circuit 460 and then received by the line interface circuit 460. The received signal is delivered over a line 475 to the A/D converter 440 where it is converted to a digital signal and delivered to the test measurement circuit 335. The test measurement circuit 335 determines the capacitance of the subscriber line 115 by examining the phase of the signal. The timer 410, which is coupled to the test measurement circuit 335 and the signal generator 430, is utilized for synchronizing the sine wave generated by the signal generator 430 with the timer 410.

The expander and the compressor 420, 425 are utilized for processing voice signals that are transmitted over the subscriber line 115. The expander and compressor 420, 425 are coupled to the Pulse Code Modulated (PCM) interfaces 450, 455, respectively. The PCM interfaces 450, 455, which are well known in the art, are generic serial buses utilized to transfer data. The expander 420 receives a digitized signal from the receiver PCM 455 and expands it before providing it to the D/A converter 445. The compressor 425 compresses an incoming digitized voice signal before providing it to the transmitter PCM 450.

The POTS circuitry 315 commonly includes a General Circuit Interface (GCI) port 490. The GCI port 490 is occasionally utilized to download POTS parameters, which may be tracked on a regular basis by a service provider, to a microprocessor (not shown) residing in a central switching office. The POTS parameters may include filter coefficients to impedance match the subscriber line 115, filter coefficients for echo cancellation in a 4-wire to 2-wire interface, or other general operating modes. It is contemplated that the GCI port 490 or other equivalent digital interface can also be utilized in a similar manner in the present invention to download the subscriber line 115 characteristics to the control logic 125.

It is envisioned that the methods of FIGS. 2a and 2b can be implemented manually, or through an automated procedure that implements the methods of FIGS. 2a and 2b on a periodic basis. For example, the test measurement circuit 335 may measure the subscriber line 115 characteristics on a daily basis and then forwards the information to the control logic 125 via the GCI port 490. Thus, it would be possible for the control logic 125 to adjust the transmission power of the driver 120 on a daily basis.

Figure 5:
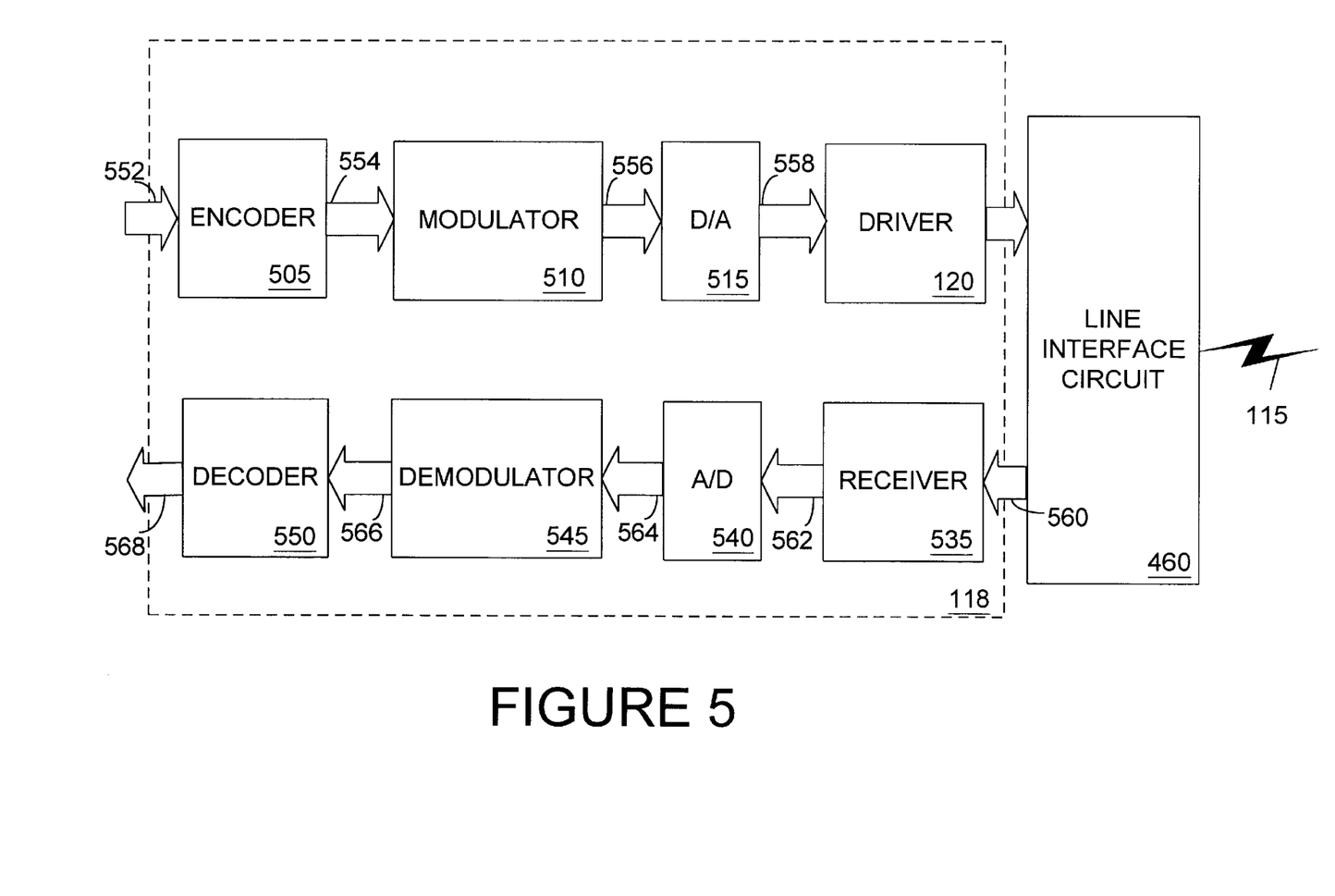
FIG. 5 illustrates a block diagram of a DSL circuitry that may be employed in the communications systems of FIG. 1 and FIG. 3.

FIG. 5 illustrates a block diagram of the DSL circuitry 118. The DSL circuitry 118 includes an encoder 505, a modulator 510, a D/A converter 515, a receiver 535, the driver 120, an A/D converter 540, a demodulator 545, and a decoder 550. The DSL circuitry 118 is coupled to the subscriber line 115 via the line interface circuit 460. The encoder 505, which is coupled to the modulator 510, encodes the input signal received over a line 552 to produce an encoded signal on a line 554. The modulator 510 modulates the encoded signal and produces a modulated signal on a line 556, which is then converted to an analog signal and placed on a line 558 by the D/A converter 515. The driver 120 then drives the analog signal onto the subscriber line 115 via the line interface circuit 460 with the transmission power determined by the control logic 125.

The DSL circuitry 118 is capable of receiving signals from the subscriber line 115 through the line interface circuit 460. The receiver 535 receives a signal over a line 560 from the line interface circuit 460 and forwards it to the A/D converter 540 over a line 562. The received signal is converted to a digital signal and placed on a line 564 by the A/D converter 540, and then demodulated to produce a demodulated signal on a line 566 by the demodulator 545. The decoder 550 decodes the demodulated signal to produce an output signal on a line 568. It should be noted that encoders 505, decoders 550, modulators 510, demodulators 545, D/A converters 515, A/D converters 540, receivers 535, drivers 120, and line interface circuit 460 are well known in the art and, thus, will not be described in detail herein so as not to unnecessarily obscure the description of the invention.

The communication systems 100, 300 of FIGS. 1 and 3 can employ the method of FIGS. 2a and 2b to regulate the transmission power of a signal. Thus, by measuring the line characteristics of the subscriber line 115, it is possible to determine the transmission power required to transmit a signal over the subscriber line 115. Furthermore, by regulating the transmission power, it is possible to transmit signals more efficiently (i.e., using less power) from the host interface 105 (see FIG. 1), 305 (see FIG. 3) to the user interface 110 (see FIG. 1), 310 (see FIG. 3), respectively. Additionally, regulating the transmission power can also reduce the near end cross-talk in nearby subscriber lines.

Figure 6:
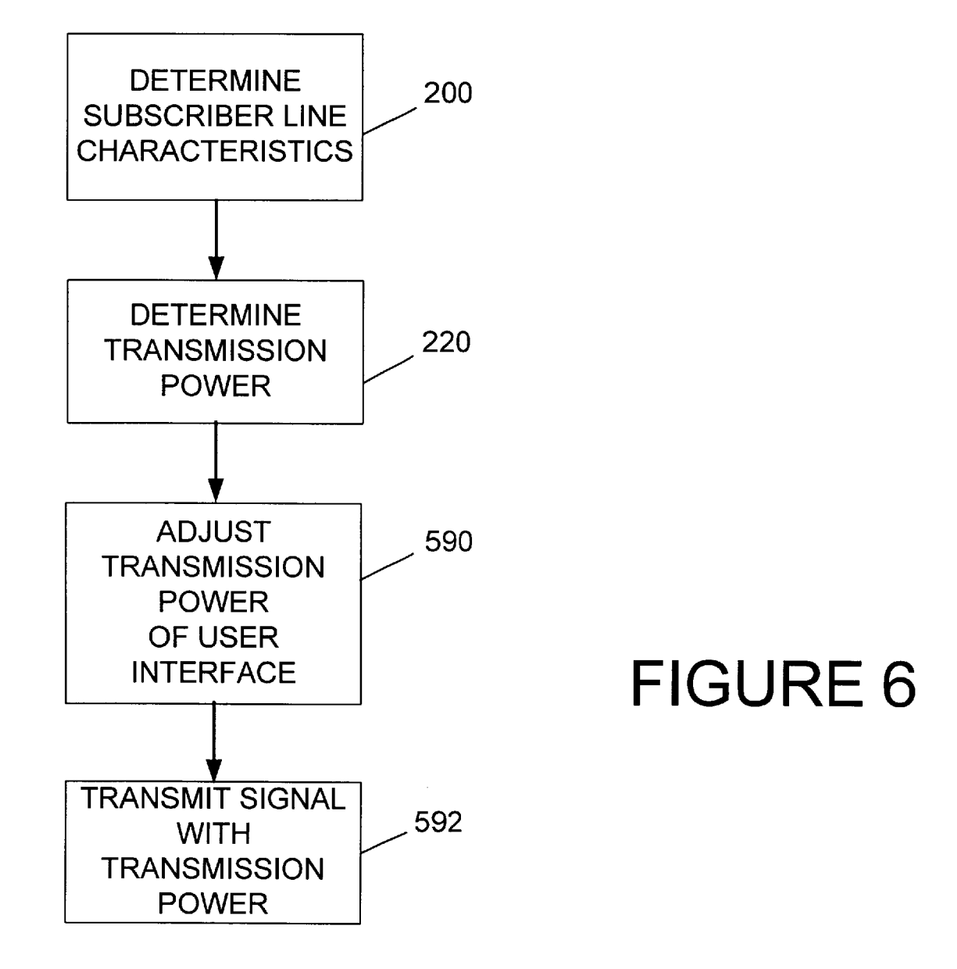
FIG. 6 depicts an alternative embodiment of a method of the present invention that can be employed by the communications systems of FIG. 1 and FIG. 3.

FIG. 6 shows that in an alternative embodiment, the transmission power determined at the block 220 (see FIG. 2) can, at block 590, be utilized to adjust the transmission power of the a DSL driver 380 (see FIG. 3) of the user interface 310 (see FIG. 3). At block 592, the DSL driver 380 of the DSL circuitry 330 (see FIG. 3) can transmit a signal on the subscriber line 115 utilizing the transmission power determined by the control logic 125 host interface 305 (see FIG. 3). The DSL circuitry 118 of the host interface 305 can adjust the transmission power of the DSL driver 380 of the user interface 310 using control signals. ADSL, for example, provides a means to adjust the transmission power of the DSL driver 380 of the user interface 310 via control flow signals. Similarly, other means of adjusting the transmission power of the DSL driver 380 of the user interface 310 are contemplated, depending on the specific implementation.

Third Embodiment

Figure 7:
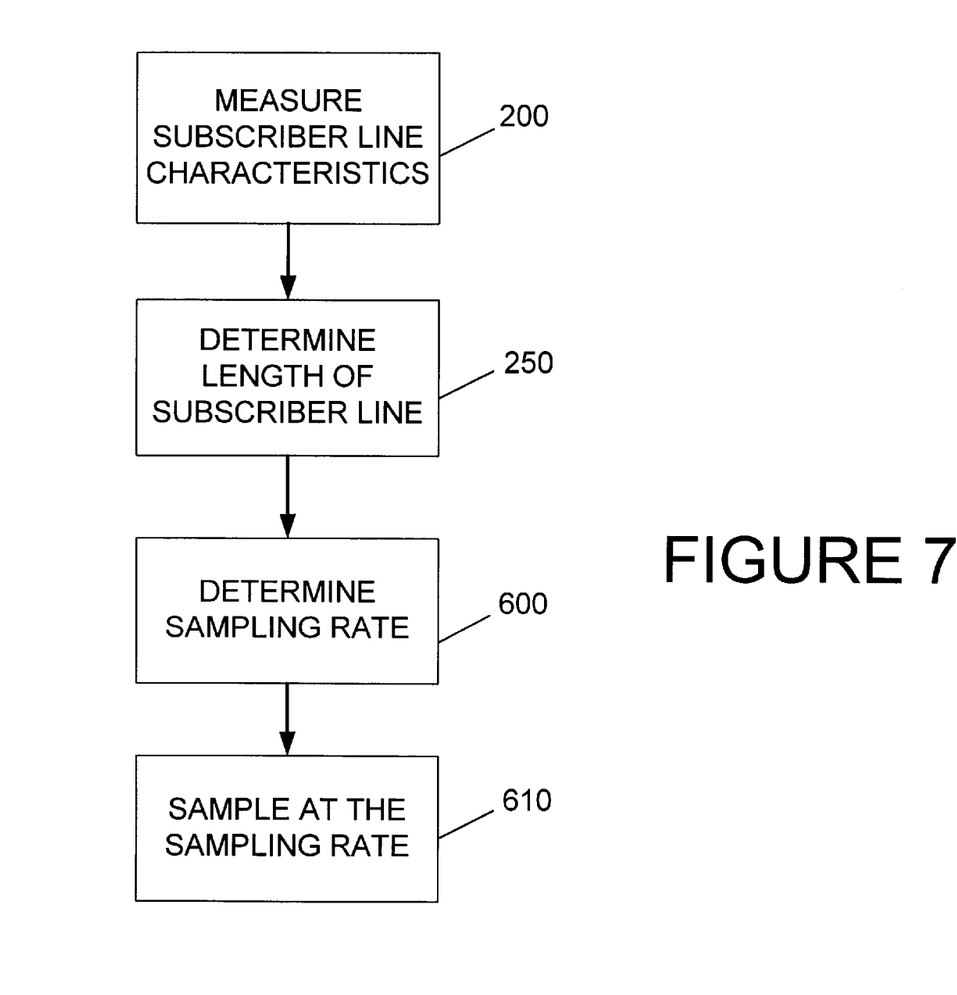
FIG. 7 depicts another embodiment of a method of the present invention that can be employed by the communications systems of FIG. 1 and FIG. 3.

In a third embodiment of the present invention, the subscriber line 115 characteristics can be utilized to transmit signals more efficiently over the subscriber line 115 using a method shown in FIG. 7. Specifically, the control logic 125 can conserve power by regulating the sampling rate of the D/A converter 515 and the A/D converter 540 based on the subscriber line 115 characteristics. The length of the subscriber line 115 can be used as an indication of the signal-to-noise ratio of the subscriber line 115. For example, for a given type of subscriber line, a shorter subscriber line tends to have a better signal-to-noise ratio than a longer subscriber line. Thus, if the length of the subscriber line 115 is known, it is possible to transmit a desired amount of data in less bandwidth. By using less bandwidth, the sample rate and rate of signal processing calculating at the same rate can be reduced.

A low signal-to-noise ratio requires the use of more bandwidth and therefore a high sampling rate, and a high signal-to-noise ratio can transmit more data per Hertz and therefore requires a low sampling rate. Furthermore, the higher the sampling rate, the more power the converters 515, 540 will consume in sampling a signal. Thus, by controlling the sampling rate, it is possible to conserve the power utilized in transmitting signals from the host interface 105, 305 to the user interface 110, 310, respectively.

The method of FIG. 7 begins at the block 200, where the test measurement circuit 127 (see FIG. 1), 335 (see FIG. 3) measures the line characteristics of the subscriber line 115. At the block 250, based on the measured line characteristics, the control logic 125 determines the length of the subscriber line 115. At block 600, based on the length of the subscriber line 115, the control logic 125 determines the sampling rate of the D/A converter 515. Thus, in this embodiment, the control logic 125 determines the sampling rate of the D/A converter 515, not the transmission power of the driver 120. At block 610, the D/A converter 515 samples the signal at the sample rate calculated by the control logic 125. The sampling rate of the D/A converter 515 can be accomplished through a control signal provided by the control logic 125 to a control input (not shown) of the D/A converter 515.

The control logic 125 may be implemented as hardware, firmware, software, or any combination thereof. Although FIGS. 1 and 3 illustrate the control logic 125 residing external to the host interface 105, 305, those skilled in the art will appreciate that in an alternative embodiment, the control logic 125 may be implemented within the host interface 105, 305. Additionally, it should be apparent to those skilled in the art the user interface 110 (see FIG. 1), 310 (see FIG. 3) may also comprise control logic 125 to measure the line characteristics of the subscriber line 115.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for regulating transmission power of a signal on a subscriber line, comprising:
   determining at least one characteristic of the subscriber line, wherein the at least one characteristic includes at least one of capacitance and impedance of the subscriber line;
   determining the transmission power needed to transmit the signal in response to the at least one characteristic of the subscriber line;
   delivering the transmission power to a user interface;
   adjusting the transmission power of a DSL driver of the user interface in response to receiving the transmission power; and
   transmitting the signal on the subscriber line in response to determining the transmission power.

2. The method of claim 1, wherein determining at least one characteristic is performed by a test measurement circuit of a POTS circuitry.

3. The method of claim 1, wherein determining at least one characteristic of the subscriber line includes measuring at least one of capacitance and impedance at frequencies above 4 KHz.

4. The method of claim 1, wherein the act of determining the transmission power includes determining the transmission power utilized by a DSL driver to drive the signal on the subscriber line.

5. The method of claim 1, further including transmitting a signal on the subscriber line using the DSL driver of the user interface.

6. The method of claim 1, wherein determining at least one characteristic of the subscriber line further comprises determining at least one characteristic of the subscriber line on a periodic basis, and the method further comprises:
   adjusting the transmission power on the periodic basis in response to determining at least one characteristic of the subscriber line on a periodic basis.

7. The method of claim 6, wherein determining at least one characteristic of the subscriber line on a periodic basis comprises determining at least one characteristic of the subscriber line each daily.

8. A method for regulating transmission power of a signal on a subscriber line, comprising:
   determining characteristic of the subscriber line;
   determining the transmission power needed to transmit the signal in response to the characteristic of the subscriber line, wherein the act of determining the transmission power includes determining a sampling rate of a digital-to-analog converter based on the characteristic of the subscriber line; and
   transmitting the signal on the subscriber line in response to determining the transmission power.

9. A method for regulating transmission power of a signal on a subscriber line, comprising:
   measuring characteristic of the subscriber line;
   determining a length of the subscriber line based on the characteristic of the subscriber line;
   determining the transmission power needed to transmit the signal in response to determining the length of the subscriber line, wherein determining the transmission power includes determining a sampling rate of a digital-to-analog converter based on the length of the subscriber line; and
   transmitting the signal on the subscriber line in response to determining the transmission power.

10. The method of claim 9, wherein measuring the characteristics of the subscriber line further comprises measuring the characteristics of the subscriber line using a test measurement circuit of a POTS circuitry.

11. The method of claim 9, wherein measuring at least one characteristic of the subscriber line further comprises measuring at least one of capacitance and impedance of the subscriber line.

12. The method of claim 11, wherein measuring at least one of capacitance and impedance further comprises measuring at least one of capacitance and impedance at frequencies above 4 KHz.

13. The method of claim 9, wherein determining the length of the subscriber line comprises determining the length of the subscriber line using a mathematical equation based on the at least one characteristic of the subscriber line.

14. The method of claim 9, wherein determining the length of the subscriber line comprises determining the length of the subscriber line using a look-up table.

15. The method of claim 9, wherein determining the transmission power comprises determining the transmission power utilized by a DSL driver to drive the signal on the subscriber line.

16. The method of claim 9, wherein measuring characteristic of the subscriber line comprises measuring characteristic of the subscriber line on a periodic basis, and the method further comprises:
   adjusting the transmission power on the periodic basis in response to measuring characteristic of the subscriber line on a periodic basis.

17. The method of claim 16, wherein measuring characteristic of the subscriber line on a periodic basis comprises measuring characteristic of the subscriber line daily.

18. An apparatus for regulating transmission power of a signal, comprising:
   a DSL circuitry;
   a test measurement circuit capable of measuring a characteristic of a subscriber line;
   a control logic capable of providing a control signal to the DSL circuitry to regulate the transmission power of the signal based on the characteristic of the subscriber line; and
   wherein the DSL circuit includes a digital-to-analog converter and wherein the control signal is provided to a control input of the digital-to-analog converter to regulate sampling rate of the digital-to-analog converter.

19. The apparatus of claim 18, wherein the DSL circuitry includes a driver and wherein the control signal is provided to a control input of the driver to regulate the transmission power of the signal based on the length of the subscriber line.

20. The apparatus of claim 18, further including a POTS circuitry, wherein the test measurement circuit resides in the POTS circuitry.

21. The apparatus of claim 18, further including a digital circuit interface adapted to provide the at least one characteristic of the subscriber line to the control logic.

22. The apparatus of claim 18, wherein the DSL circuitry comprises a driver and wherein the control signal is provided to a control input of the driver to regulate the transmission power of the signal based on the at least one characteristic of the subscriber line.

23. The apparatus of claim 18, further comprising a POTS circuitry, wherein the test measurement circuit resides in the POTS circuitry.

24. The apparatus of claim 18, further comprising a digital interface adapted to provide the at least one characteristic of the subscriber line to the control logic.

25. The apparatus of claim 24, wherein the digital interface is a general circuit interface.

26. The apparatus of claim 18, wherein the test measurement circuit is configured to measure the characteristic of the subscriber line on a periodic basis, and wherein the control logic is configured to regulate the transmission power on the periodic basis.

27. The apparatus of claim 26, wherein the periodic basis is daily.

28. An apparatus for regulating transmission power of a signal, comprising:
   a DSL circuitry;
   a test measurement circuit capable of measuring characteristic of a subscriber line;
   a control logic capable of determining length of the subscriber line based on the characteristic of the subscriber line, and providing a control signal to the DSL circuitry to regulate the transmission power of the signal based on the length of the subscriber line; and
   wherein the DSL circuitry includes a digital-to-analog converter and wherein the control signal is provided to a control input of the digital-to-analog converter to regulate sampling rate of the digital-to-analog converter.

29. The apparatus of claim 28, wherein the DSL circuitry comprises a driver and wherein the control signal is provided to a control input of the driver to regulate the transmission power of the signal based on the length of the subscriber line.

30. The apparatus of claim 28, further comprising a POTS circuitry, wherein the test measurement circuit resides in the POTS circuitry.

31. The apparatus of claim 28, further comprising a digital circuit interface adapted to provide the at least one characteristic of the subscriber line to the control logic.

32. The apparatus of claim 28, wherein the test measurement circuit is configured to measure the characteristic of the subscriber line on a periodic basis, and wherein the control logic is configured to regulate the transmission power on the periodic basis.

33. The apparatus of claim 32, wherein the periodic basis is daily.

34. A method for regulating transmission power of a signal on a Plain Old Telephone Service subscriber line, comprising:
   measuring a characteristic of the subscriber line using a test measurement circuit of the Plain Old Telephone Service;
   determining length of the subscriber line based on the characteristic of the subscriber line;
   determining the transmission power needed to transmit the signal in response to determining the length of the subscriber line;
   transmitting the signal on the subscriber line with the transmission power; and
   wherein determining the transmission power includes determining a sampling rate of a digital-to-analog converter based on the length of the subscriber line.

35. The method of claim 34, wherein measuring the at least one characteristic of the subscriber line includes measuring at least one of capacitance and impedance of the subscriber line.

36. The method of claim 34, wherein measuring characteristic of the subscriber line further comprises measuring characteristic of the subscriber line on a periodic basis, the method further comprises:
   adjusting the transmission power on the periodic basis in response to determining the length of the subscriber line on a periodic basis.

37. The method of claim 36, wherein measuring characteristic of the subscriber line on a periodic basis comprises measuring characteristic of the subscriber line daily.

38. The method of claim 34, wherein determining the transmission power includes determining the transmission power utilized by a DSL driver to drive the signal on the subscriber line.

39. A method for regulating a signal on a subscriber line, comprising:
   measuring a characteristic of the subscriber line;
   determining length of the subscriber line based on the characteristic of the subscriber line;
   determining a sampling rate for a digital-to-analog converter based on the length of the subscriber line; and
   delivering the signal on the subscriber line in response to determining the sampling rate.

40. The method of claim 39, wherein measuring the characteristics of the subscriber line further comprises measuring the characteristics of the subscriber line using a test measurement circuit of a POTS circuitry.

41. The method of claim 39, wherein measuring a characteristic comprises measuring at least one of capacitance, inductance, and impedance.

42. The method of claim 41, wherein measuring at least one of capacitance, inductance, and impedance comprises measuring at least one of capacitance, inductance, and impedance at frequencies above 4 KHz.

43. The method of claim 39, wherein determining length of the subscriber line comprises determining the length of the subscriber line using a mathematical equation based on the characteristic of the subscriber line.

44. The method of claim 39, wherein determining length of the subscriber line comprises determining the length of the subscriber line using a look-up table.

* * * * *